(12) United States Patent
Billman et al.

(10) Patent No.: US 10,062,129 B1
(45) Date of Patent: *Aug. 28, 2018

(54) SYSTEMS AND METHODS FOR A HOME MARKET ALERT SERVICE

(71) Applicant: United Services Automobile Association (USAA), San Antonio, TX (US)

(72) Inventors: Bradly Jay Billman, San Antonio, TX (US); Charles Lee Oakes, III, Boerne, TX (US); Reynaldo Medina, III, San Antonio, TX (US); Michael Patrick Beuche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,046

(22) Filed: Oct. 6, 2017

Related U.S. Application Data

(63) Continuation of application No. 15/343,682, filed on Nov. 4, 2016, now Pat. No. 9,811,867, which is a
(Continued)

(51) Int. Cl.
*H04W 24/00* (2009.01)
*G06Q 50/16* (2012.01)
(Continued)

(52) U.S. Cl.
CPC ....... *G06Q 50/16* (2013.01); *G06F 17/30864* (2013.01); *H04W 4/02* (2013.01); *G06Q 50/20* (2013.01); *H04L 67/306* (2013.01)

(58) Field of Classification Search
CPC ....... H04W 4/02; H04W 88/02; H04W 60/04; H04W 48/04; H04W 4/18; H04L 12/1895;
(Continued)

(56) References Cited

U.S. PATENT DOCUMENTS 6,385,541 B1 5/2002 Blumberg et al.
7,071,842 B1 7/2006 Brady, Jr.
(Continued)

OTHER PUBLICATIONS

Rob Cross, "Six Myths About Informal Networks . . . And How to Overcome Them," downloaded 2008, http://webapp.comm,virginia.edu, 16 pages.
(Continued)

*Primary Examiner* — Nimesh Patel
(74) *Attorney, Agent, or Firm* — Baker & Hostetler LLP

(57) ABSTRACT

Disclosed herein are a method, system, and computer-readable storage medium comprising instructions for notifying a user of available realty in proximity to the user's approximate current location. In an embodiment, a triggering location region is defined based on the user's approximate current location. The triggering location region includes a second location that is associated with another person's profile that correlates with the user's profile. An alert is automatically provided to the user if available realty is within the defined triggering location region. In another embodiment, if available realty within the triggering location region meets the user's preferred criteria, information about the available realty may be automatically provided to the user.

20 Claims, 8 Drawing Sheets

Related U.S. Application Data continuation of application No. 12/060,416, filed on Apr. 1, 2008, now Pat. No. 9,497,795.

(51) Int. Cl.
*G06F 17/30* (2006.01)
*H04W 4/02* (2018.01)
*G06Q 50/20* (2012.01)
*H04L 29/08* (2006.01)

(58) Field of Classification Search
CPC .............. H04M 2242/14; G06Q 30/02; G06Q 20/3224; G06Q 10/087; G06Q 20/32; G06Q 20/322; G06Q 30/0267
See application file for complete search history.

(56) References Cited

U.S. PATENT DOCUMENTS

| | | |
|---|---|---|
| 8,145,661 B1 | 3/2012 | Billman et al. |
| 9,811,867 B1 * | 11/2017 | Billman .................. G06Q 50/16 |
| 2002/0065739 A1 | 5/2002 | Florance et al. |
| 2002/0174090 A1 | 11/2002 | Dexter |
| 2004/0030631 A1 | 2/2004 | Brown et al. |
| 2004/0215793 A1 | 10/2004 | Ryan et al. |
| 2005/0273346 A1 | 12/2005 | Frost |
| 2006/0041663 A1 | 2/2006 | Brown et al. |
| 2006/0136498 A1 | 6/2006 | Insley |
| 2006/0195442 A1 | 8/2006 | Cone et al. |
| 2007/0150537 A1 | 6/2007 | Graham |
| 2007/0219712 A1 | 9/2007 | Abhyanker |
| 2007/0233582 A1 | 10/2007 | Abhyanker |
| 2007/0255581 A1 | 11/2007 | Otto et al. |
| 2007/0260465 A1 | 11/2007 | Cook |
| 2009/0018996 A1 | 1/2009 | Hunt et al. |

OTHER PUBLICATIONS

Steiniger, S. et al., "Foundations of Location Based Services," Project CartouCHe-Lecture notes on LBS, Feb. 9, 2008, retrieved from <URL:http://www-users.cs.umn.edu/research/shashi-group/CS8715/IM7 steiniger.pdf> 28 pages.

* cited by examiner

SYSTEMS AND METHODS FOR A HOME MARKET ALERT SERVICE

CROSS REFERENCE TO RELATED APPLICATIONS

This application is a continuation and claims priority to U.S. patent application Ser. No. 15/343,682, filed Nov. 4, 2016, which is a continuation of and claims priority to U.S. patent application Ser. No. 12/060,416, filed Apr. 1, 2008 and is related by subject matter to the embodiments disclosed in the following commonly assigned applications: U.S. patent application Ser. No. 12/060,401 and U.S. patent application Ser. No. 12/060,403, each filed on Apr. 1, 2008 and each entitled "Systems and Methods for a Home Market Alert Service," and U.S. patent application Ser. No. 12/059,351, U.S. patent application Ser. No. 12/059,474, U.S. patent application Ser. No. 12/059,563, each filed on Mar. 31, 2008 and each entitled "Systems and Methods for a Home Area Recommender." The disclosure of each application is incorporated by reference herein in its entirety.

BACKGROUND

Typically, individuals interested in purchasing or renting real estate wish to identify available properties that fall within the bounds of their selected search parameters (e.g., price range, square footage, number of bedrooms, etc.). A real estate agent or a listing service provides a method of searching for realty so that an individual can browse and pare down realty listings based on the selected search parameters. However, the details about each available property and the method of providing those details to a user may be limited.

A user may identify areas of interest and include those areas in his search parameters. The listing service or a real estate agent may offer a subscribing user or customer the option to receive periodic email updates. However, these email updates are typically scheduled for periodic delivery to the user, such as once per day. Thus, the user may not receive real time information. In addition, the email updates typically only include listings or updates for properties within designated locations.

SUMMARY

Disclosed herein are a computer-readable storage media, methods, software applications, and computer systems for a location-based service application that uses a user's approximate current location to provide information about properties within a certain range of the user's location. The application may notify the user that he is in proximity to both available realty and other people that share similar features with the user. A real-time or near real-time alert can be generated to the user on a suitable device to notify the user that they are within range of such a property location. The alert can automatically link the user to information about the property or neighborhood while on location. The application may provide alerts or information to a user for properties that satisfy more than basic property details.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

Disclosed herein is a location-relevant application that identifies the locations of individuals with similar features to the user and notifies the user if any available realty is in proximity to those locations. The subject matter of the disclosed embodiments is described with specificity to meet statutory requirements. However, the description itself is not intended to limit the scope of this patent. Rather, the claimed subject matter might also be embodied in other ways, to include elements similar to the ones described in this document in conjunction with other present or future technologies.

It would be desirable to receive alerts about available realty that are in proximity to a user's current location. Furthermore, it would be desirable that the alerts are received for available realty in proximity to other individuals that share common features with the user. It would be desirable for the user to have the option of accessing further information about the alert, such as specifics about the property. Furthermore, it would be desirable that the details that are provided for a property include information beyond the objective search parameters provided by most listing services.

Embodiments are related to comparing a user's approximate current location to available realty locations. The user's approximate location may be determined via location-based technology or otherwise provided by the user. The available realty locations are those that are in proximity to individuals that have similar characteristics to the user. An alert may be provided to the user to notify the user that they are in the vicinity of such available realty locations. The user may be automatically provided information about the available realty when the user enters the vicinity of the available realty location. The application enables prospective buyers or renters to be notified when they are near available properties that may be of interest because the properties are also close to similarly situated individuals. The available properties may be real estate for sale or apartments for rent, for example.

Figure 1:
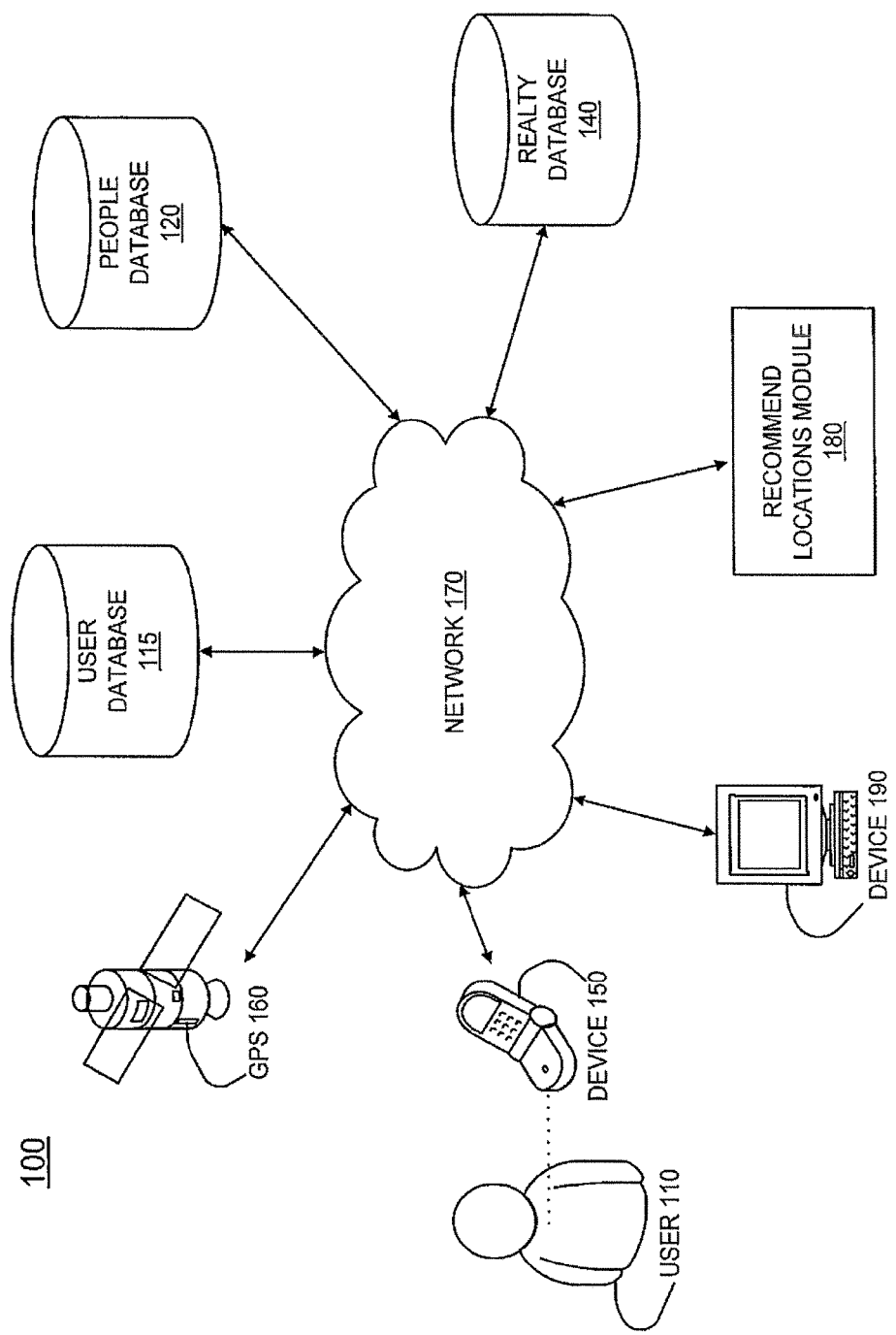
FIG. 1 depicts an example configuration of a system that compiles location-relevant information and recommends locations to a user.

FIG. 1 illustrates an example system 100 in which aspects of the techniques described herein may be employed. System 100 may include user 110, devices 150 and 190, global positioning system (GPS) 160, a user database 115, a people database 120, a realty database 140, and a recommend locations module 180.

User 110, recommend locations module 180, realty database 140, user database 115, people database 120, device 150, device 190, and GPS 160 may communicate with one another by way of network 170, such as a communications network. The network 170 may include, for example, an intranet, the Internet, a local area network (LAN), a wide area network (WAN), a public switched telephone network (PSTN), a cellular network, a voice over internet protocol (VoIP) network. User 110 may communicate with recommend locations module 180 through device 150 over the network, for example.

Device 150 may be a wired or wireless phone, a computer, a facsimile machine, an imbedded chip, a watch, or a personal digital assistant (PDA), for example. Device 150 may include a receiver, such as, for example, a GPS receiver for receiving GPS information, such as coordinate and time information, related to device 150.

Each of the databases 115, 120, and 140, may be any form of data storage, including a storage module, device, or memory, for example. The databases 115, 120, and 140, either separately or combined, may be provided as a database management system, an object-oriented database management system, a relational database management system (e.g. DB2, Access, etc.), a file system, or another conventional database package. Further, the databases can be accessed via a Structure Query Language (SQL), or other tools known to one of ordinary skill in the art.

The realty database 140 may contain an inventory of realty information, such as a structured collection of records and/or data for real estate or rental properties, including residential properties, commercial properties, lots of land, or the like. An entity such as a listing service or a real estate agency may maintain and update the realty database 140 or storage of realty information. For example, single associations of realtors or real estate brokers may control local and private realty databases. Often, the entity has reciprocal access agreements to the commonly known Multiple Listing Service (MLS), which is a group of private realty databases used by real estate brokers to share information about available properties. The realty database 140 may be downloaded onto a device 150 or device 190 that a user 110 can locally access, or the realty database 140 may reside on a remote server that is accessible via the network 170.

The information in the realty database 140 may be structured to enable a person or program to extract desired information so that the service can share information about realty that is available. The realty database 140, shown as a single database, represents any number of databases or data stores that include realty information that may be accessed to determine available realty locations 245. The realty database 140 may be publicly accessible and searchable and may include homes available in the marketplace for purchase or rent, including homes listed in the Multiple Listing Service (MLS), homes for-sale-by-owner, etc. Not all sellers or realtors choose to list their realty on the MLS. Homes for-sale-by-owner typically includes realty information that is not contained in the Multiple Listing Service. Sometimes, an alert to new homes for sale is accomplished via word of mouth. A user 110 or entity acting on behalf of the user 110 may input realty information into a website, device 190, or on his device 150, for example, that may be searched or accessed similar to listings on a MLS. A separate database with realty information other than realty information from the MLS may be maintained and accessed separately from a database with MLS information, or they may be combined. The information from the realty database 140 may be shared a variety of ways, such as on the internet or through distribution in newspapers, etc. For example, the user may access the realty database 140 from a web type of browser.

User database 115 may operate to store multiple user identifiers, where each user identifier is associated with a user 110. A user identifier may include information related to the user 110 and a device 150 or 190 associated with the user. A user identifier associated with user 110 may include an identification given to user 110 which may be, for example, a randomly generated character and/or number string or a name of user 110, and information related to device 150 associated with user 110, such as, for example, a mobile phone number.

The user identifier may be linked to a user profile associated with the user 110. The profile may include information about the user 110, such as the user's age, number of children, etc. The user identifier may also be associated with preferred criteria associated with the user 110, where the preferred criteria set forth parameters for searching the realty database 140. Preferred criteria may include details that the user 110 is seeking in a property to buy or rent, such as the preferred number of bedrooms, or his preferred price range. The authority maintaining the user database 115 may suggest preferred criteria for a user based on user details, such as setting the preferred number of bedrooms to three if the user has two children.

The people database 120 may contain an inventory of information about individuals, for example. The people database 120 may compile information about individuals in the form of other person's profiles, each of the profiles being associated with a location. The link between another person's profile and the location may be based on the residence of the individual, such as the address of the property they own or rent. For example, another person's profile may include an individual's name, age, and profession; the location associated with the other person's profile may be the person's residential address.

The people database 120 may include information from a variety of sources. For example, a service provider could collect and store information about its customers and maintain a people database 120. The service provider may be any organization or business that provides a service to a consumer or business, or the like. Examples of such entities include membership organizations, such as employer/employee organizations, and providers of services, such as insurance companies, home-locator services, employers seeking to provide information to its employees, or the like. For example, an employee may maintain a people database 120 of employee information, which includes descriptive details of each employee, such as their name, address, etc. In another example, a listing service or real estate agency manages both the people database 120 and the realty database 140 to provide available realty locations to its customers.

The information in the people database 120 may be structured to enable a person or program to extract desired information so that the service can share information about individuals and where they live. Thus, the people database 120 may be publicly accessible and searchable and may enable an entity to access the other person's profiles to compare them to a user profile from the user database 115.

The recommend locations module 180 may compare information from the databases 115, 120, and 140, to recommend a location to the user 110 based on the user's approximate current location. The recommend locations module 180 may define triggering location regions. If the user's 110 approximate current location is in proximity to an available realty located within or around the triggering location region, the recommend locations module 180 may alert the user 110.

Location information pertaining to the user 110 may be received from a variety of types of position determining equipment having different underlying technologies, such as: GPS (Global Positioning System); angle of arrival (AOA); time difference of arrival (TDOA); Line of Sight (LOS); etc. FIG. 1 shows the use of GPS 160 to assist in the determination of the location of device 150 associated with user 110. For example, GPS 160 may include multiple satellites that orbit above the Earth. The GPS satellites may each contain a computer, an atomic clock, and a radio, operating to continuously broadcast its changing position and time. A GPS receiver, such as the receiver in device 150, may contain a computer or processing unit operating to calculate the position of the GPS receiver through receipt of time signals. The position may be calculated from three satellites through a process called trilateration or through a process called triangulation, for example. The position may be provided in the form of a longitude and latitude. The GPS receiver may further calculate altitude, speed of travel, and direction of travel.

The property information could alternatively be sent to another device 190. Device 190 may be a computer at home, a facsimile machine, a watch, a personal digital assistant (PDA), and the like, for example. If the user 110 does not have the ability to review the property information immediately, the information may be later accessed from device 190. An entity that maintains realty information, such as the entity managing the realty database 140, may provide property information to the user 110 over the network 170.

The location-based technology may continuously determine the location of user 110, such as through device 150. The user database 115 may be updated to store these locations, along with the time, and the properties identified by the recommend locations module 180. To conserve storage space in realty database 140, the realty information may be stored at a predetermined time interval and may be deleted after a predetermined time period has elapsed. For example, available realty information related to user's 110 location may be captured in the user database 115 every 20 minutes. User database 115 may delete the available realty information related to user 110 after the information has been stored for 10 days, for example. The authority maintaining the user database 115 may decide the factors (e.g. when to perform the deletions) concerning realty database 140, for example. The user database 115 may store previously identified realty locations and suppress the alert if the user has previously dismissed the property or has specifically requested that the location is not to trigger an alert.

Figure 2:
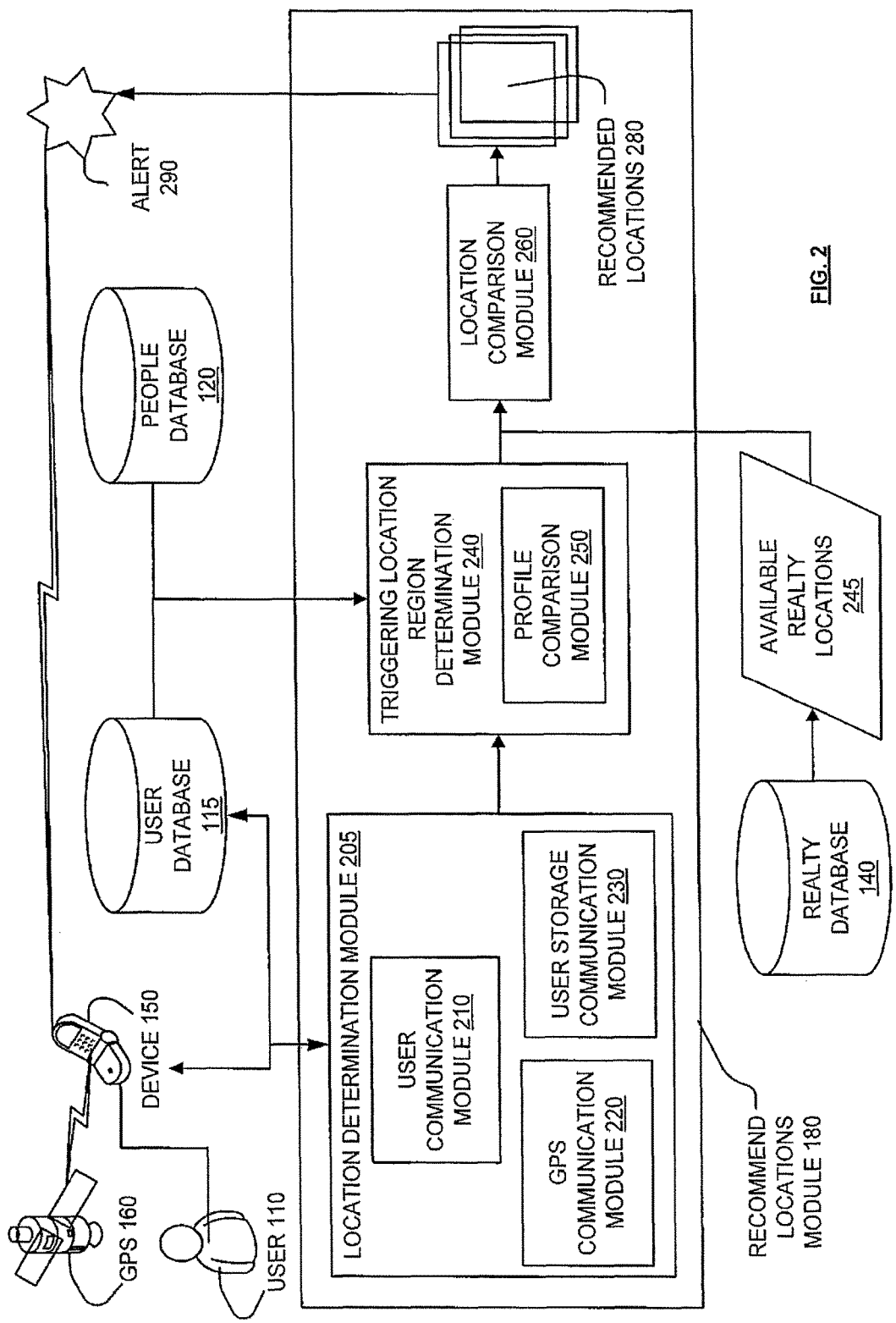
FIG. 2 depicts an example configuration of a recommend locations module utilized by the system in FIG. 1.

FIG. 2 illustrates an example recommend locations module 180 and the information processed by the recommend locations module 180. The recommend locations module 180 may operate to define triggering location regions and determine if available realty is located in or around those triggering location regions.

The recommend locations module 180 may include several means, devices, software, and/or hardware for performing functions, including an example location determination module 205, an example triggering location region determination module 240, and an example location comparison module 260. Location determination module 205 may include GPS communication module 220, user communication module 210, and user storage communication module 230. The triggering location region determination module 240 may include a profile comparison module 250.

Location determination module 205 may employ device 150 associated with user 110 and GPS 160 to assist in a location determination process. The device 150 that is associated with the user 110 may receive information from and provide information to location determination module 205. GPS communication module 220 may communicate with GPS 160 to obtain the GPS information of device 150. GPS information may include a timestamp with the longitude and latitude coordinates of device 150. Alternately, the location may be in the form of an address, with a street number, city, and state, for example. Location determination module 205 may provide the determined location user storage communication module 230.

User communication module 210 may provide an indication to user storage communication module 230, which may operate to identify a user identifier associated with user 110. User storage communication module 230 may provide the GPS position and the user identifier to user database 115 for storing the GPS information and associating the information with a user identifier. User storage communication module 230 may communicate the user identifier with user database 115 to access details in the user's profile or preferred criteria associated with the user 110. The location determination module 205 may provide the determined user's approximate current location to triggering location region determination module 240.

The triggering location region determination module 240 may include a profile comparison module 250. The profile comparison module 250 may access a user profile associated with the user identifier. The user profile may be retrieved from the user database 115. Alternately, the user storage communication module 230 may provide the user profile to the location determination module 205 to be sent to the triggering location region determination module 240.

The profile comparison module 250 may compare the user profile to other person's profiles from the people database 120. The profile comparison module 250 may compare other person's profiles to a user profile by comparing an item in the user profile to items in the other person's profiles. A particular item may be selected as a comparison item. For example, a user may be an employee relocating to a new area. The user may select his profession and his employer as the selected comparison item from his user profile. The profile comparison module 250 will search the other person's profiles in the people database 120 to find individuals that have the same or a similar profession that work for the same employer, for example.

The other person's profiles are each linked to a location, such as an individual's residence, for example. If an item in a user's profile, such as a select comparison item chosen by the user 110, correlates to an item in any of the other person's profiles the locations associated with the correlating other person's profiles along with the user's approximate current location as determined by the location determination module 205, are used to define a triggering location region. Profiles may correlate if they have matching items or similar concepts.

The user's 110 approximate current location combined with the locations of the correlating other person's profiles are used to define a triggering location region or regions. The triggering location region determination module 240 uses the user's 110 approximate current location and the locations that result from the profile comparison module 250 to define a triggering location region or to define multiple triggering location regions. For example, the triggering location region may be defined as any area within a specified range from the user's approximate current location. A larger triggering area region may encompass multiple more focused triggering area regions that are shaped and positioned based on clusters of locations that result from the profile comparison module 250. For example, an encompassing triggering area region may include a single location or all of the locations associated to the correlating user 110 profiles as determined by the profile comparison module 250. The focused triggering area regions may be distributed around locations with a higher population or proximity of other users associated to those locations. The focused triggering area regions may be defined, for example, by a high concentration of overlapping areas, where each area is a region around a location associated to a correlated other person's profile. The triggering location regions may be represented in the form of a heat map, which is a graphical representation of the locations from the profile comparison module 250 shown on a two-dimensional map.

A predetermined range from the user may be set to define the outer bounds of the outermost triggering location region. Alternately, the range from the user may be a variable range that is modified based on the locations that result from the profile comparison module 250. For example, the user may select a suggested range within which he would like to receive alerts or property information for available realty of interest that are within that range from the user's 110 approximate current location. However, a cluster of locations that result from the profile comparison module 250 may extend beyond that suggested range, or there may be a cluster of locations that are just beyond the suggested range. The range may be statistically varied to include locations beyond the user's suggested range under the appropriate circumstances. The user 110 may select to include an area as a triggering location region that is not within his range, but has a high concentration of locations associated to correlating person profiles. Each triggering location region may receive a rank that corresponds to the number and/or proximity of locations associated to correlating user profiles within that region.

The location comparison module 260 may compare the location of the available realty locations 245 to the triggering location region(s) to determine if any available realty locations 245 are within the triggering location region(s). For example, an available realty location 245 may be the latitude and longitude boundaries of a house for sale. The coordinates of the available realty location 245 may be compared against the bounds of the triggering location region. If the available property is in part or entirely within the triggering location region, then it follows that the user is within a certain range from the available property since the triggering location region is defined by a variable range from the user.

The available realty locations 245 that are compared against the triggering location region may be pared down by preferred criteria. A user 110 or an entity acting on behalf of the user 110 may select preferred criteria to define baseline search parameters associated with the user 110. The user 110 may be looking to purchase realty, and he may set preferred criteria to include search parameters of a desired property. For example, the search parameters could be objective information desired in a specific property, such as the number of bedrooms, price range, and square footage, for example. Thus, the available realty locations 245 may be a subset of locations of the available realty in realty database 140 based on the user's preferred criteria.

The location comparison module 260 compares the available realty locations 245 to the triggering location region determined by the triggering location region determination module 240. The location comparison module 260 determines if any of the available realty locations 245 overlap or are within the triggering location region. If so, the property may be a recommended location 280.

The user 110 may be notified that the user 110 is on or in proximity to an available realty location. If the available realty location is within a triggering location region and also meets a user's preferred criteria, the user 110 may be automatically provided with property information related to the recommended location 280. If the available realty locations 245 are not pared down based on the user's preferred criteria, the user 110 may automatically be provided with an alert. The user 110 will know that the alert is for a location within a triggering location region and that the location correlates to another person's profile with at least one item that correlates to the user's profile. If desired, the user 110 can choose to access further information about the property. In this way, the user 110 may consider properties that are not within preferred criteria but that may be of interest because of the proximity of the available realty locations 245 to other similarly situated individuals. A service maintaining the realty database 140, such as a listing service, or an entity maintaining the people database 120, such as a service provider, may provide the alert 290 or property information to the user 110.

The alert or property information may be provided to the user 110 on the device 150. For example, the results may be received through a phone call, text message, email, or other message through device 150. The message may include an update of a program embedded on a device 150 that is capable of displaying the results in some manner, such as through text, map, image, etc. Depending on the device, the user 110 may select the alert, or follow a link associated with the alert, to receive more information if desired. The alert may include a link to property information, or an automatic email could be sent. The user 110 may view a heat map that quantitatively depicts the locations of the correlated user profile locations within a triggering location region, as well as providing an indication as to available realty locations 245 located within that triggering location region. Thus, the user 110 may be provided real-time or near real-time access to property information associated with the user's location that triggered the alert, for example, while the user 110 is at or near the available realty.

The location comparison module 260 may automatically perform comparisons based on the inputs from the triggering location region determination module 240, which is directly tied to the user's approximate current location. The user 110 may not need to initiate a request, but rather receive automatic alerts from the entity utilizing the location comparison module 260. The location comparisons may be performed continuously. For example, if the device 150 is a cell phone or laptop, or the like, the location of the device 150 associated with the user 110 may be constantly changing as the user 110 carries the device 150 with him. Thus, the location comparison module 260 may be constantly performing updates of the user's location and comparing the user's changing location against both locations that result from the profile comparison module 250 and locations in the realty database 140.

An example scenario demonstrates the uses of the applications described. For example, David is the user 110, and he has been relocated to a new office three towns away. David, as user 110, has a personal digital assistant (PDA)

with him, which is the device 150 associated with the user. He and his wife, Mary, take a drive to the new job location to familiarize themselves with the area. They would like to move closer to David's new job location.

David may have a user profile stored in the user database 115 that includes information about himself such as his age, profession, employer, or marital status, for example. Other person's profiles from people database 120 may include similar objective details about other individuals. David may have created his user profile, or it may have been created by a third party. The profiles may be stored by a service provider or other organization. For example, a user's insurance company or bank may store details about the user that make up the user's profile. Online databases may maintain profile information pertaining to a user as well, such as a database maintained by a social networking website.

The location determination module 205 may employ device 150 associated with user 110 and GPS 160 to assist in determining David's approximate current location. The profile comparison module 250 compares David's user profile to other person's profiles. David could select comparison items from his user profile to be compared against other person's profiles. For example, he may highlight salary range, marital status, and profession. David may desire to live near other people with families, or that went to a particular undergraduate school. He may be relocating as an active officer in the military and want to buy or rent property by other military personnel.

The profile comparison module 250 identifies any other person's profiles that correlate to David's user profile or satisfy his selected comparison items. The locations, in combination with the user's approximate current location, are used to define a triggering location region. In this example, David set the outer bounds of the triggering location regions to be five miles from his approximate current location, and he drives to the parking lot of his new office. At least one other person's profile is linked to a location within 5 miles of David, and the boundary around that location is defined in this example to be the triggering location region.

If an available realty location is determined to be within a triggering location region, David is alerted on his device 150, in this case a PDA. If David has a suitable device 150, he may be provided property information or follow a link provided with the alert to display more information. Thus, David can view property information that is in proximity to his current location. Rather than having to drive through an area aimlessly looking for "for sale" signs, David and Mary automatically know if they are in an area with properties that may be of interest to them. If David had selected preferred criteria, such as a desired property price range or number of bedrooms, the available realty locations 245 that are compared against the triggering location region may be a subset of the available realty locations 245 from the realty database 140. David may automatically receive the property information in these circumstances because the information automatically provided are from an even more focused search that are particular to his desires.

When an available realty location is identified within a triggering location region, an alert is sent to the user 110. Depending on the device 150, the user 110 may select the alert, or follow a link associated with the alert, to receive more information if desired. For example, the alert may include a link to property information or directions to the available realty. The user 110 may be able to access the heat map as depicted in FIG. 3 that quantitatively depicts the locations of the correlated user profile locations within the triggering location region, as well as providing an indication to available realty locations located within that triggering location region.

Figure 3:
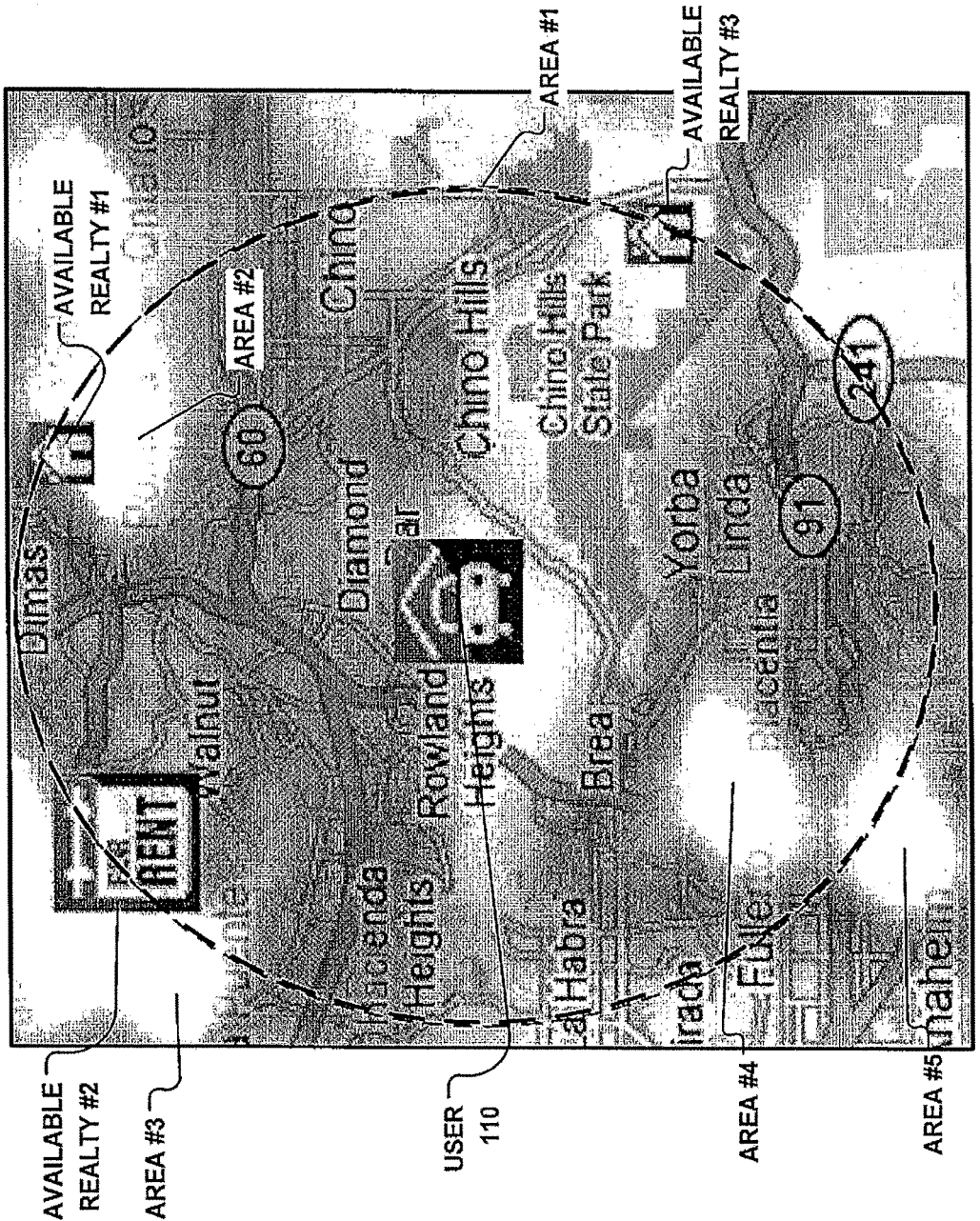
FIG. 3 depicts an example heat map representing triggering location regions and a user's approximate current location.

An example snap shot of a user's travels and the calculated triggering location regions are displayed on the heat map in FIG. 3. The triggering location region(s) may move with the user. As the user travels, the location determination module is constantly updating the user's location and providing it to the triggering location region determination module. The triggering location regions are at least in part defined based on the locations that result from the profile comparison module 250 (depicted in FIG. 2). FIG. 3 includes an example user 110 and a snap shot of the user's location, the bounds for the outermost triggering location region, Area #1, and the different colors which represent different concentrations of individuals that are similarly situated to the user.

In this example, the user's approximate current location is shown to be near the center of the displayed map. The location determination module 205 depicted in FIG. 2 may determine the user's approximate current location. The outer bounds of the triggering location region in this example is set to be approximately 10 miles around the user's 110 approximate current location, as shown by area #1. This outermost triggering location region may be a variable range, such as a discrete value that may change. As shown in FIG. 3, the outermost triggering location region, represented by Area #1, may encompass multiple focused triggering location regions, represented by Areas #2, #3, #4, and #5. Each triggering location region may be shaped and colored based on the number and proximity of locations that result from the profile comparison module 250 previously described.

In general, the heat map may display colors to represent, quantitatively, the location of users with correlating user profiles that are within the discrete or variable range from the user's 110 approximate current location. A focused triggering location region may be defined by a clustering technique, which partitions the locations associated to correlating user profiles. Colors on the map may represent clusters of locations associated with correlating user profiles. A user 110 may view the pictorial representation of the heat map along with an indication of available realty on the heat map. Thus, the user 110 has a visual representation of other user locations with respect to the user's 110 approximate current location.

[A user 110 may view the pictorial representation of the heat map along with an indication of available realty on the heat map that are located with respect to the user's 110 approximate current location. For example, available realty #1 is a house for sale and is shown in close proximity to a focused triggering location region, area #2. Available realty #2 is an apartment for rent and is shown in close proximity to a focused triggering location region, area #3. Available realty #3 is a house for sale, but is not located near a significant number of individuals that share common features to the user 110. Thus, the user 110 is notified if and when he is nearby individuals that share similar features to the user 110, and in addition, the user 110 is notified if there are any available realty locations. However, if available realty #1 and #2 did not exist, the user 110 could still be notified of available realty #3 because it is within area #1, which is a triggering location region. By viewing the heat map, the user 110 can further pare down the locations of the similarly situated individuals and the locations of any available realty. The user 110 may also view other areas on the map that indicate similarly situated users, even if there is no available realty, such as the triggering location regions indicated by areas #4 and #5.

The heat map may include display of multiple colors, each providing a different indication regarding the colored area. A color range may be shown on the map that directly indicates how close a realty is to a user's approximate current location, and a similar or different color range may indicate how close available realty is to the user's preferred criteria or to similarly situated people. For example, one color may be used to indicate houses within close proximity to a user's approximate current location that correlate to the user's preferred criteria, and another color may be used to indicate realty within close proximity to a user's approximate current location that correlates to people that have similar features to the user. Different strengths of the color could be an indication of percentages. For example, dark green and light green could represent more or less available realty locations, respectively, within proximity to the user's approximate current location that meet the user's preferred criteria. Different colors could be used to indicate a range of correlation, as well, such as certain colors that indicate a 70% match to the user's preferred criteria, for example.

The heat map may be stored by the user. Specific information provided by the heat map may be quantitatively stored, such as addresses for available realty locations shown. A screen shot or a single instance of the heat map may be stored and interactively accessed at a later time. The storage of the information may be done by the device 150 or sent as a data file to device 190, stored with the user's profile, stored by an entity acting on behalf of the user 110, or the like.

Figure 4:
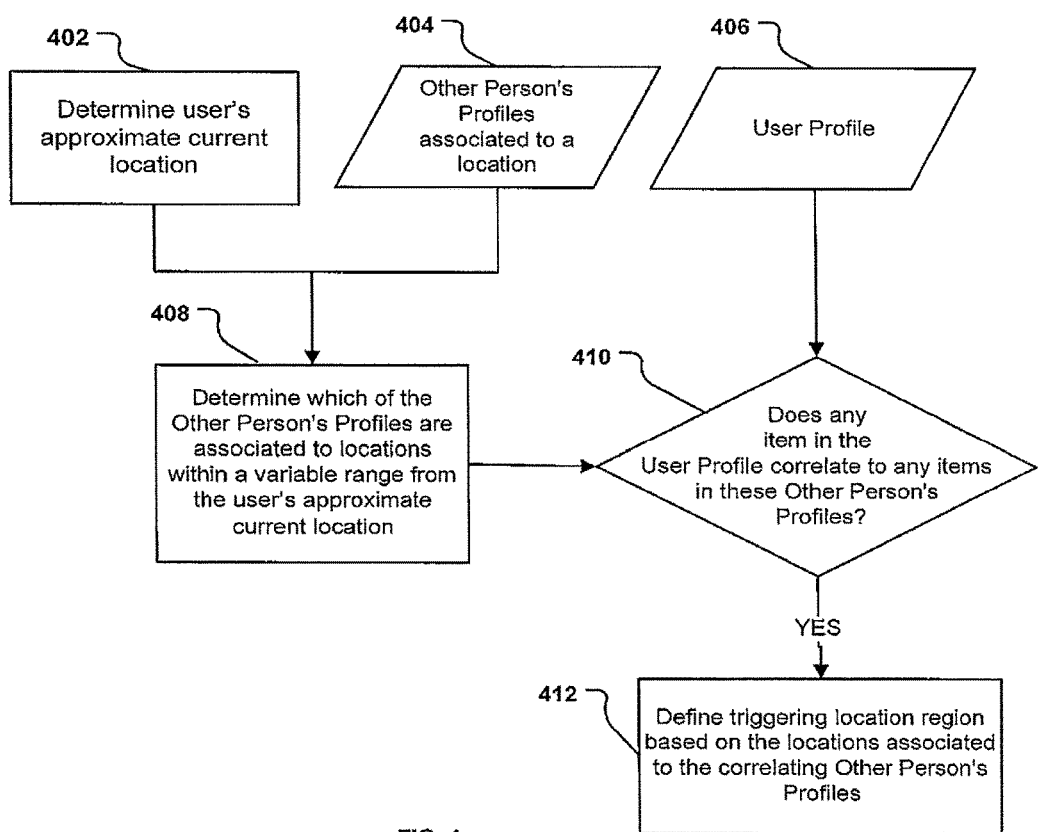
FIG. 4 depicts an example method of defining a triggering location region.

FIG. 4 depicts an example of a method for defining a triggering location region. At 402, a user's approximate current location is determined. The user's approximate current location may be identified using location-based technology as described above, such as GPS. For example, a location determination module may employ a device associated with the user and GPS technology to assist in a location determination process.

Each of the other person's profiles from 404, which are associated with a location, may be input into 408 for a determination of the other person's profiles that are associated with a location within a variable range from the user's approximate current location. The other person's profiles at 404, which are associated with a location, may be based on the proximity of the location associated with the other person's profile to the user's approximate current location. The location associated with the other person's profile from 404 may need to be within a certain range from the user's approximate current location, for example.

At 410, the other person's profiles are compared to the user's profile by comparing an item in the user profile to items in other person's profiles. A particular item may be selected as a comparison item. For example, a user may be an employee relocating to a new area. The user may select his profession and his employer as the selected comparison item from his user profile. The profile comparison module will identify the other person's profiles from 404 that have the same or a similar profession that work for the same employer, for example.

If an item in the user profile, such as a select comparison item chosen by the user, correlates to an item in any of the other person's profiles from 404, the locations associated with the correlating other person's profiles, along with the user's approximate current location, are used to define a triggering location region.

Figure 5:
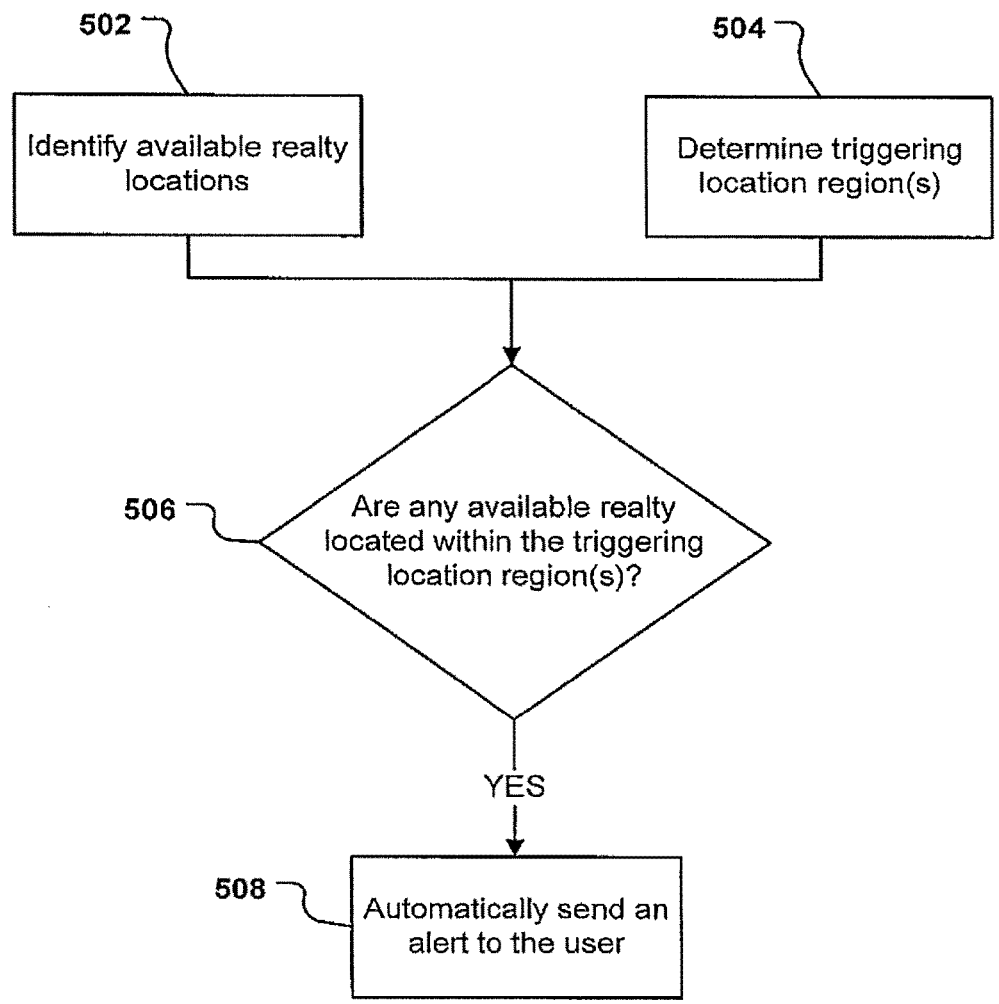
FIG. 5 depicts an example method of alerting a user to available realty within a triggering location region.

FIG. 5 depicts an example method for automatically sending alerts to a user for available realty locations that are within the triggering location region. At 502, available realty locations are identified. For example, an entity may perform a search on a realty database to identify available realty locations. At 506, the available realty locations identified at 502 are compared against the triggering location region determined at 504. The triggering location region may be determined as described in FIG. 4 or represented by the heat map depicted in FIG. 3. If any available realty locations are found to be within the triggering location region, an alert may be automatically sent to the user. Because the triggering location region is directly correlated to the user's approximate current location, the method depicted in FIG. 3 may be continuously performed as the user's approximate current location changes and may provide automatic alerts to the user when an available realty location satisfies the conditions set forth.

When an available realty location is identified within a triggering location region, an alert is sent to the user at 508. Depending on the device, the user may select the alert, or follow a link associated with the alert, to receive more information if desired. For example, the alert may include a link to property information or directions to the available realty. The user may be able to view the heat map as depicted in FIG. 3 that quantitatively depicts the locations of the correlated user profile locations within the triggering location region, as well as providing an indication to available realty locations located within that triggering location region.

Figure 6:
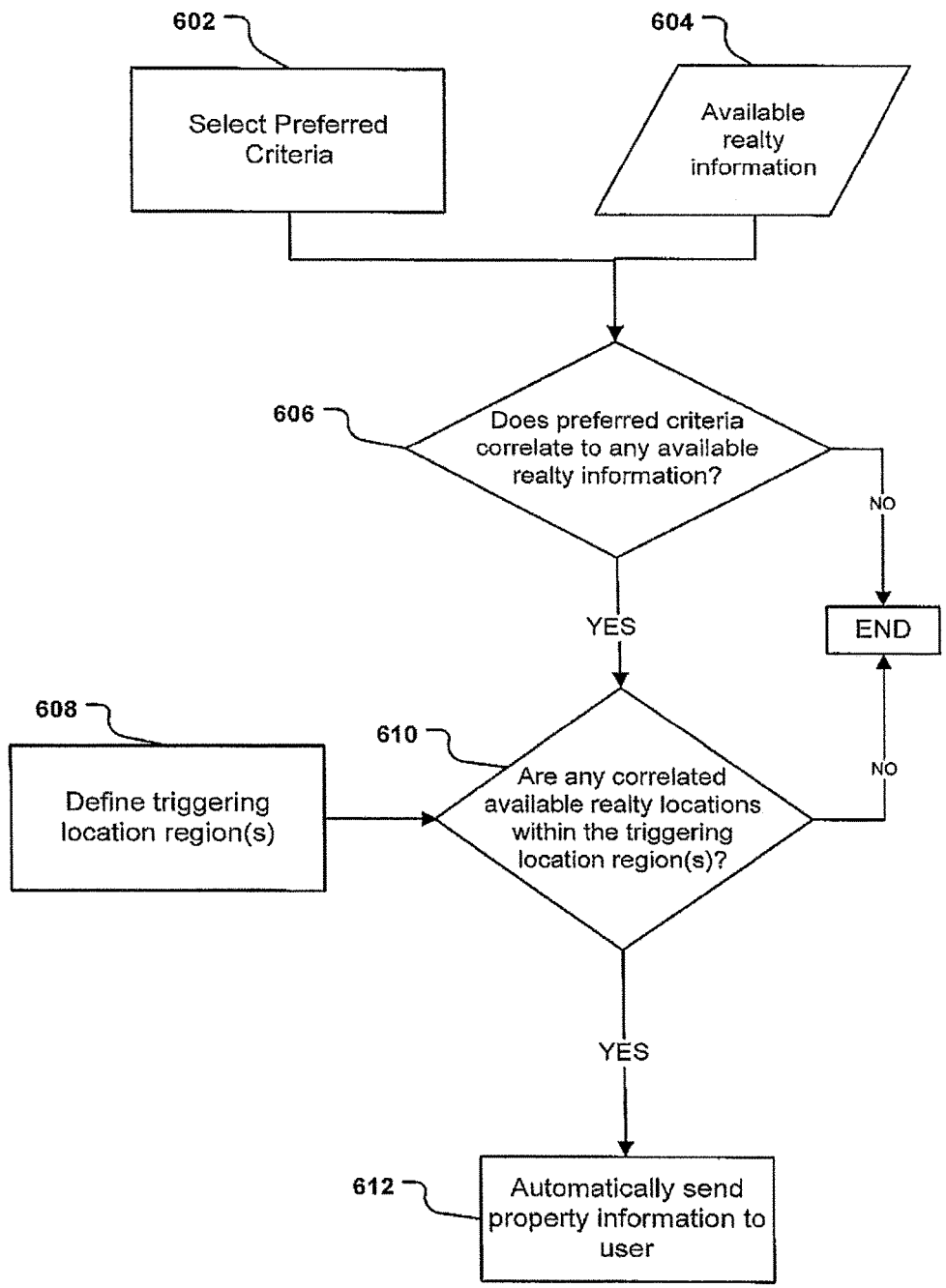
FIG. 6 depicts an example method of sending property information to a user.

FIG. 6 depicts an example method for automatically generating and providing available realty information to a user. In this embodiment, the available realty locations that are compared against the triggering location region are pared down by preferred criteria. The preferred criteria may be selected at 602 may provide baseline search parameters associated with a user 110. For example, the user 110 may be looking to purchase realty, and he may set preferred criteria to include search parameters of a desired property. The search parameters could be objective information desired in a specific property, such as the number of bedrooms, price range, and square footage, for example. The preferred criteria may also include information that can be measured subjectively.

At 606, the user's preferred criteria is compared against available realty information provided by 604. If any of the preferred criteria correlates to available realty information, those locations are selected for comparison to a triggering location area at 610. The triggering location region may be defined at 608 and provided for comparison at 610. If none of the preferred criteria correlates to available realty information, the method may terminate. Alternately, a user 110 may select to be notified periodically when no correlations are made, or be provided available realty with an indication that the available realty does not correlate to the user's 110 preferred criteria.

If any available realty locations are found to be within the triggering location region, the property information may be automatically sent to the user at 612. If none of the correlated available realty locations are within any of the triggering location regions, the method may terminate. Alternately, a user 110 may select to be notified periodically when no correlations are made, or be provided available realty within the triggering location region with an indication that the available realty does not correlate to the user's 110 preferred criteria. Because the triggering location region is directly correlated to the user's approximate current location, the method depicted in FIG. 3 may be performed continuously, providing automatic property information to the user when an available realty location satisfies the conditions set forth. The realty information provided to the user by the method depicted in FIG. 6 will be properties that are available, meet the user's preferred criteria, and are within a certain range from other individuals with similar features to the user.

Many individuals consider other factors besides the basic details about a property to determine if a location appeals to them. For example, subjective information about a neighborhood or the area may help an individual decide if an available realty is of interest. Subjective information may be information belonging to a subject rather than to the object of thought, such as an individual's opinions about a location. For example, prospective buyers of real estate in an area may be interested in knowing a resident's opinion and assessment of location-relevant attributes, such as how busy they think traffic is in the area or if a neighbor has an incessantly barking dog. Prospective renters may want opinions from current or previous tenants, such as their opinion about whether an apartment building is kid-friendly, or if their landlord has a tendency to delay fixing reported problems. The preferred criteria associated with a user may include both subjective and objective information.

Figure 7:
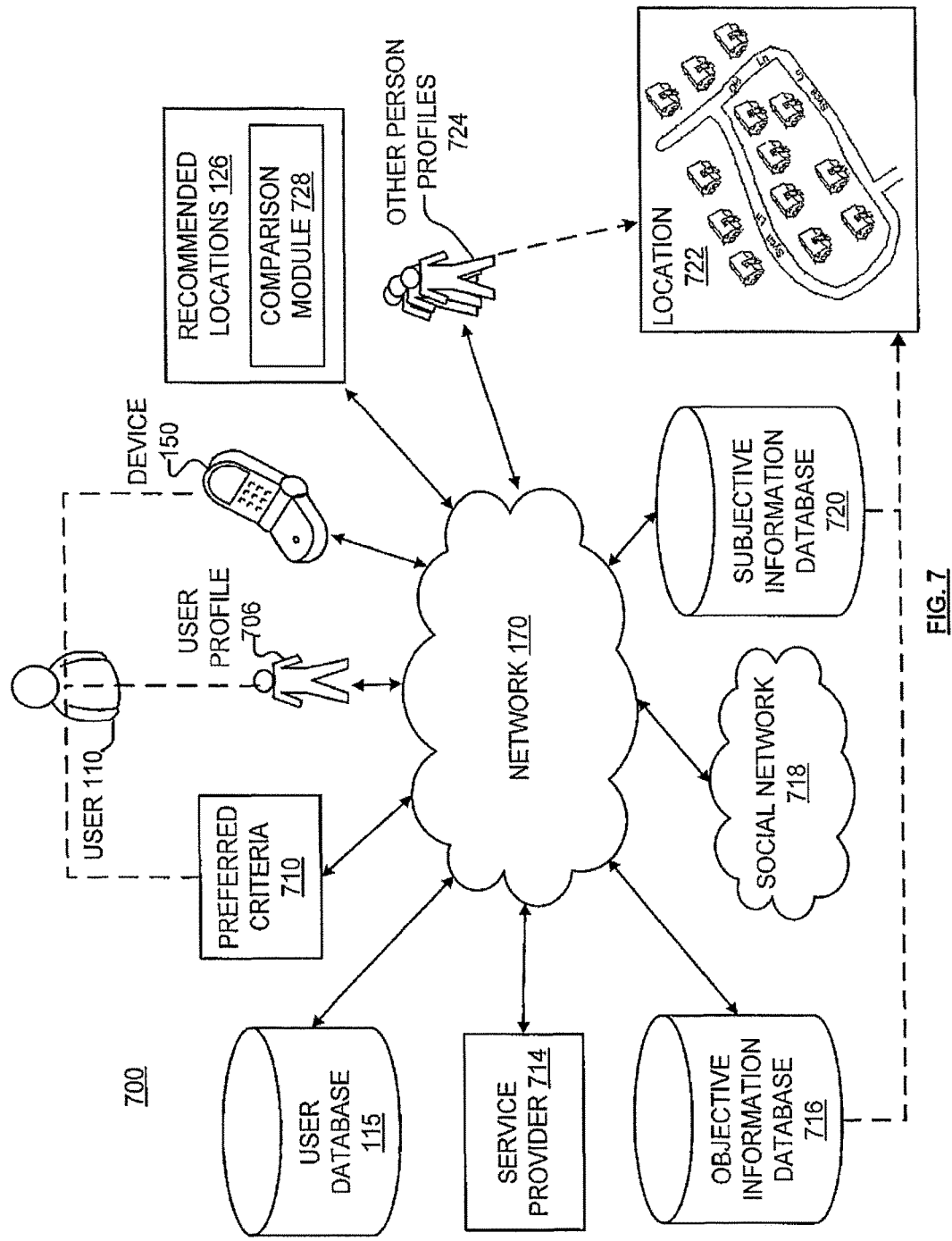
FIG. 7 depicts an example configuration of a system that compiles location-relevant information utilizing a social network.

FIG. 7 illustrates an example system 700 in which aspects of the techniques described herein may be employed, where the preferred criteria includes both objective and subjective information. Example system 700 may incorporate location-relevant subjective information that may be compared against the preferred criteria set by a user. System 700 may include an objective information database 716, a subjective information database 720, and other person's profiles 724 that are associated to an associated location 722. The associated location 722 may be defined narrowly, such as a single property location, or it may be broader and encompass, for example, a neighborhood, a region, an apartment complex, etc. Further, the system 700 may include a social network 718, a service provider 714, and a comparison module 728 The components may communicate over a communications network 170 to share information, as shown in FIG. 1. Any of these components may have direct access to each other for sharing or storing information.

System 700 may include a social network 718 for collecting information associated to an associated location 722, including subjective information that is compiled by the subjective information database 720. Social networking services are becoming more commonplace for building online social relationships for communities of people that share interests and activities. The social network 718 may be web-based and provide a variety of ways for users 110 and to interact, such as through chat programs, email, video, file sharing, discussion groups, etc. The social network 718 may have additional features, such as the ability to create groups that share common interests or affiliations, upload videos, or hold discussions in forums. The user 110 may input a user profile 706 onto the social network 718. Other users may also create profiles on the social network 718, input comments onto the social network 718, or access information from the social network 718.

In general, social networking services break down into two broad categories: internal social networking (ISN) and external social networking (ESN) sites. An ISN is a closed/private community that consists of a group of people within a company, association, society, education provider and organization or even an "invite only" group created by a user 110 in an ESN. An ESN is open/public and available to all web users to communicate and are designed to attract advertisers Services such as social networking sites, and the like, typically contain directories of some categories, such as former classmates, connecting with friends, etc. Personal networks may be created between friends, family, colleagues, classmates, or people that are otherwise similarly situated. Individuals tend to be more likely to trust and value the opinions of people they know, and the network relationships provide a way for people to connect to more people. Individuals will also be more likely to trust people that are similarly situated, even if they do not know them personally. For example, employees of the same company that are located in different parts of the country or world may trust or value the opinion of a fellow employee who they have never met in person merely because they have similar circumstance.

Thus, the subjective information database 720 may compile information that is stored, input, or otherwise gathered through the social network 718, and this subjective information may be associated to an associated location 722. For example, a contributor to the social network 718 could include a comment about a certain location or provide information about a particular neighborhood by tagging the comment with the corresponding location. The information may be specific to an address or be broad information about an area. For example, a user 110 of the social network 718 could identify an address and include a note about a very noisy dog. Or, a user 110 could select an area by zip code or neighborhood name and provide an opinion about traffic or speculations as to why a road is closed to the public, for example.

User profiles 106 and other person's profiles 724 may include information from a variety of sources. For example, the profiles 706 and 724 could be created on the social network 718, uploaded from a service provider 714, or stored by an employer. The other person's profiles 724 are associated to a location, such as associated location 722, so the information in the other person's profile 724 may also be associated to the associated location 722. For example, another person's profile 724 may include an individual's name, age, and profession, and be associated to the person's residential address. Thus, an individual may provide information about a location on a social network 718, for example, and the profile 724 could be associated to one associated location, such as associated location 722. However, the information that the individual places on the social network 718 could be associated to a different location, the different location being the location for which the individual is providing information. For example, the individual could select an address or a street and provide subjective information, despite where the user resides. As described above, the subjective information database 720 may compile and link both the information and the associated location 722.

Thus, a collaboration of the components in system 700 could result in the aggregation of location-relevant and people-relevant information. A comparison module 128 may then utilize this information to provide recommended locations to the user 110. The entity that utilizes the comparison module 728 may automatically generate and provide the recommended location(s) 126 to a user. Thus, the user 110 does not have to search through a social network 718 to find out certain information. For example, the user 110 could receive daily email updates with the recommendations.

There are many scenarios that would benefit from the location-relevant application described. For example, it is common for prospective buyers to drive by a property for sale that did not come up in their search because of certain selected criteria, but that appeals to them in person. Some users may not be actively searching for a home, but they are alerted to a property that they want to follow up on. Users may be on a trip, or visiting a friend, and be alerted to a vacation home, or a fixer-upper that they want to invest in. Some prospective buyers like to drive to an available property to evaluate the property from the outside and make observations as to the surrounding properties and surrounding neighborhood amenities. On location, or close by, the user can access information about the neighborhoods, schools, crime rate, traffic, zoning, and work commutes. The user can observe the property in person with minimal delay.

Alerts may be provided to a user when they are near an available realty location that has had a change in information, such as a price change, or if the property goes under contract. The available realty may have been previously identified as a property of interest by the user, either automatically based on their preferred search, or selected by the user or a user's agent.

Figure 8:
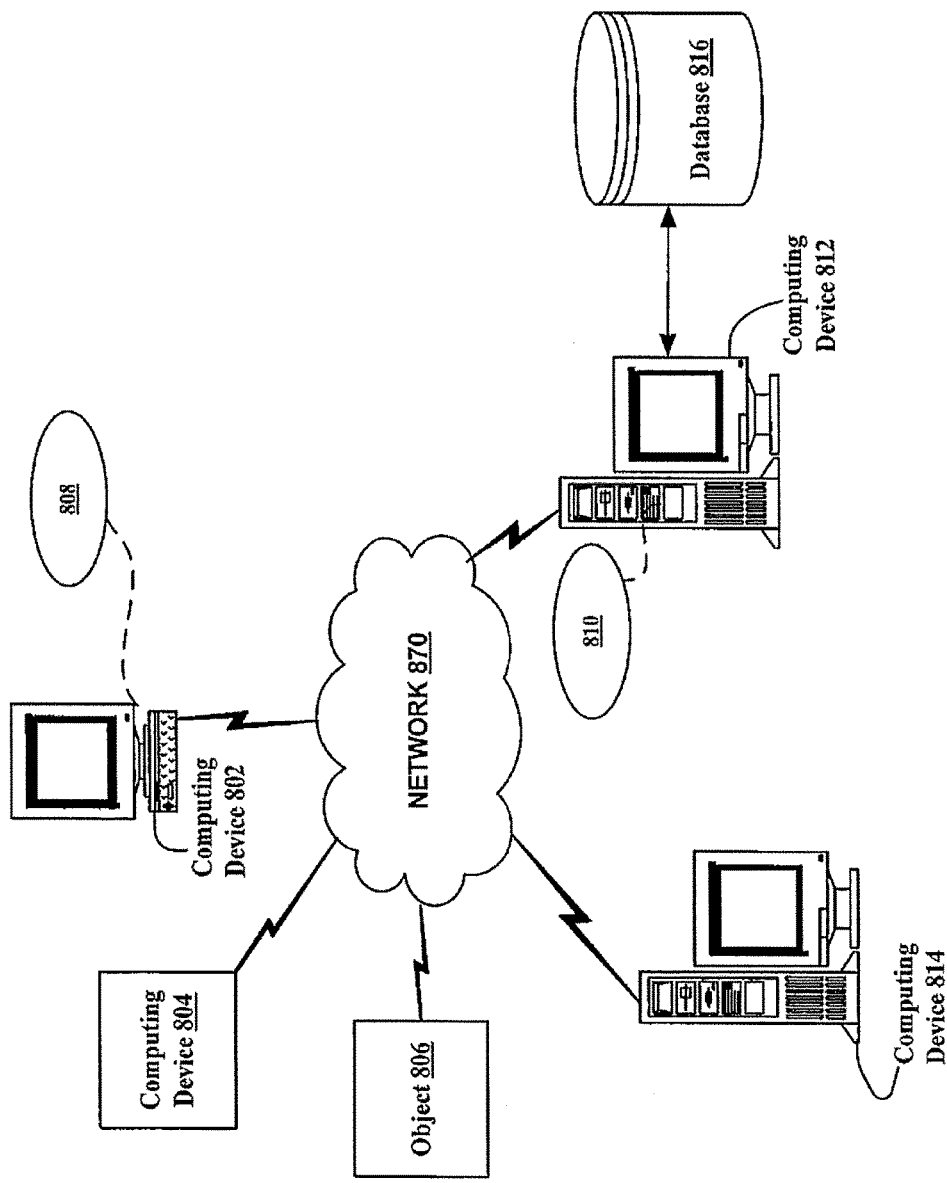
FIG. 8 depicts an example configuration of entities that are networked to perform the disclosed techniques.

FIG. 8 depicts an exemplary networked computing environment in which many computerized processes may be implemented to perform the processes described above. One of ordinary skill in the art can appreciate that networks can connect any computer or other client or server device, or in a distributed computing environment. In this regard, any computer system or environment having any number of processing, memory, or storage units, and any number of applications and processes occurring simultaneously, is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 8 provides a schematic diagram of an exemplary networked or distributed computing environment. The environment comprises computing entities 802, 804, 812, and 814 as well as objects 806, 808, and 810, and database 816. Each of these entities 802, 804, 806, 808, 810, 812, 814, and 816 may comprise or make use of programs, methods, data stores, programmable logic, etc. The entities 802, 804, 806, 808, 810, 812, 814, and 816 may span portions of the same or different devices such as PDAs, audio/video devices, MP3 players, personal computers, etc. Each entity 802, 804, 806, 808, 810, 812, 814, and 816 can communicate with another entity 802, 804, 806, 808, 810, 812, 814, and 816 by way of the communications network 870. In this regard, any entity may be responsible for the maintenance and updating of a database 816 or other storage element.

This network 870 may itself comprise other computing entities that provide services to the system of FIG. 6, and may itself represent multiple interconnected networks. In accordance with an aspect of the presently disclosed subject matter, each entity 802, 804, 806, 808, 810, 812, 814, and 816 may contain discrete functional program modules that might make use of an API, or other object, software, firmware and/or hardware, to request services of one or more of the other entities 802, 804, 806, 808, 810, 812, 814, and 816.

It can also be appreciated that an object, such as 810, may be hosted on another computing device 812. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 8, any entity 802, 804, 806, 808, 810, 812, 814, and 816 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 8 and the further diversification that can occur in computing in a network environment such as that of FIG. 8, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

As mentioned above, while exemplary embodiments have been described in connection with various computing devices, the underlying concepts may be applied to any computing device or system. Thus, the methods and systems of the present embodiments may be applied to a variety of applications and devices. While exemplary names and examples are chosen herein as representative of various choices, these names and examples are not intended to be limiting. One of ordinary skill in the art will appreciate that there are numerous ways of providing hardware and software implementations that achieves the same, similar or equivalent systems and methods achieved by the embodiments.

As is apparent from the above, all or portions of the various systems, methods, and aspects of the present embodiments may be embodied in hardware, software, or a combination of both. It is noted that the foregoing examples have been provided merely for the purpose of explanation and are in no way to be construed as limiting of the present embodiments. While the embodiments have been described with reference to various embodiments, it is understood that the words which have been used herein are words of description and illustration, rather than words of limitation. Further, although the embodiments have been described herein with reference to particular means, materials, the embodiments is not intended to be limited to the particulars disclosed herein; rather, the embodiments extend to all functionally equivalent structures, methods and uses, such as are within the scope of the appended claims.

What is claimed:

1. A computer-implemented method comprising:
   determining a current location of a mobile device of a real estate buyer using a location sensor of the mobile device;
   identifying a nearby plurality of residents having resident profiles within a range of the current location, wherein the resident profiles include resident items respectively describing the plurality of residents;
   comparing a buyer profile associated with the real estate buyer to the plurality of resident profiles, wherein the buyer profile includes buyer items describing the real estate buyer;
   identifying, based on the comparison, a correlated resident profile among the nearby plurality of residents, the correlated resident profile correlating with a buyer profile;
   determining realty available proximate to a resident address associated with the correlated resident profile;
   transmitting an alert to the mobile device of the real estate buyer indicating the realty available; and
   causing presentation of the alert via the mobile device of the real estate buyer,
   wherein the buyer items and the resident items include demographic factors, and wherein the demographic factors include an age, a profession, an employer, a marital status, a salary range, and a family status.

2. The method of claim 1, further comprising:
   accessing the buyer profile associated with the buyer from a user database.

3. The method of claim 1, further comprising:
   accessing the realty available from a realty database.

4. The method of claim 1, further comprising:
   defining a trigger location for the realty available, the alert is based on the trigger location; and
   receiving, at the mobile device, information about the realty available within the trigger location.

5. The method of claim 1, wherein the buyer items and the resident items further include an environmental factor.

6. The method of claim 5,
   wherein the environmental factor includes one of traffic, noise, road conditions, and kid friendliness.

7. The method of claim 1, wherein the buyer profile includes one or more of a property criteria, an educational criteria, a governmental criteria, and/or a demographic criteria.

8. The method of claim 7 further comprising:
   wherein the property criteria includes a number of bedrooms, a price, a square footage, whether a property is for sale or for rent,
   wherein the educational criteria includes school district information
   wherein the governmental criteria includes a zoning status, and
   wherein the demographic criteria includes a crime rate.

9. A system comprising:
   a location sensor of a buyer mobile device configured to determine a current buyer location of a real estate buyer;
   a user database configured to store a buyer profile including realty criteria;
   a people database configured to store a plurality of resident profiles associated with a plurality of residents within a range of the current buyer location;
   a profile comparison module configured to compare a buyer profile associated with the real estate buyer to a plurality of resident profiles, wherein the buyer profile includes buyer items describing the real estate buyer, and wherein the resident profiles include resident items respectively describing the plurality of residents, and wherein correlated resident profiles correlating with the real estate buyer profile is identified based on comparing the buyer profile with the plurality of resident profiles;
   a realty database configured to store an inventory of realty information;
   a recommend locations module associated with a networked computer executing instructions read from a storage medium configured to:
   receive the current buyer location of the real estate buyer;
   receive, from the profile comparison module, the correlated resident profiles;
   determine, from the realty database, realty available proximate to the current buyer location and a resident address associated with the correlated resident profile;
   transmit an alert to the buyer mobile device indicating the realty available; and
   provide the alert to the real estate buyer using the mobile device
   wherein the buyer items and the resident items include demographic factors, and wherein the demographic factors include an age, a profession, an employer, a marital status, a salary range, and a family status.

10. The system of claim 9, wherein the real estate buyer sets an outer bound of the range.

11. The system of claim 9, wherein the current buyer location is dynamic and moves with the real estate buyer.

12. The system of claim 9, further comprising identifying at least one cluster of realty based on the correlation, the cluster of realty including the realty.

13. The system of claim 12, further comprising extending the range to include the realty cluster based on a statistical calculation.

14. The system of claim 12, further comprising representing at least the realty cluster according to a heat map.

15. A non-transitory computer-readable storage medium comprising computer-readable instructions comprising:
   determining a current location of a mobile device of a real estate buyer using a location sensor of the mobile device;
   identifying a nearby plurality of residents having resident profiles within a range of the current location, wherein the resident profiles include resident items respectively describing the plurality of residents;
   comparing a buyer profile associated with the real estate buyer to the plurality of resident profiles, wherein the buyer profile includes buyer items describing the real estate buyer;
   identifying, based on the comparison, a correlated resident profile among the nearby plurality of residents, the correlated resident profile correlating with a buyer profile;
   determining realty available proximate to a resident address associated with the correlated resident profile;
   transmitting an alert to the mobile device of the real estate buyer indicating the realty available; and
   causing presentation of the alert via the mobile device of the real estate buyer
   wherein the buyer items and the resident items include demographic factors, and wherein the demographic factors include an age, a profession, an employer, a marital status, a salary range, and a family status.

16. The non-transitory computer-readable storage medium of claim 15, further comprising receiving a set of realty search criteria from at least one of the real estate buyer or a third party.

17. The non-transitory computer-readable storage medium of claim 16, wherein the set of realty search criteria is at least one of objective information or subjective information.

18. The non-transitory computer-readable storage medium of claim 15, wherein the alert is received on a device associated with the buyer.

19. The non-transitory computer-readable storage medium of claim 15, the instructions further comprise:
   defining a trigger location for the realty available, the alert is based on the trigger location; and
   receiving information about the realty available within the trigger location.

20. The non-transitory computer-readable storage medium of claim 19, wherein information about the realty available within the trigger location is maintained in a database remote to a current location associated with the real estate buyer.

* * * * *